(12) United States Patent
Hu et al.

(10) Patent No.: US 12,197,202 B2
(45) Date of Patent: Jan. 14, 2025

(54) LIQUID ASSISTED AIR COOLING MODULE INTERFACE IN AN INFORMATION HANDLING SYSTEM

(71) Applicant: Dell Products L.P., Round Rock, TX (US)

(72) Inventors: Sandburg Hu, Shanghai (CN); Xiaoliang Zhou, Nantong (CN); Joe Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 352 days.

(21) Appl. No.: 17/737,797

(22) Filed: May 5, 2022

(65) Prior Publication Data

US 2023/0297099 A1    Sep. 21, 2023

(30) Foreign Application Priority Data

Mar. 21, 2022    (CN) .......................... 202210279592.X (51) Int. Cl.
| | | |
|---|---|---|
| *G05B 23/02* | (2006.01) | |
| *G06F 1/20* | (2006.01) | |
| *G06F 11/30* | (2006.01) | |

(52) U.S. Cl.
CPC .......... *G05B 23/0286* (2013.01); *G06F 1/20* (2013.01); *G06F 11/3031* (2013.01); *G06F 11/3058* (2013.01)

(58) Field of Classification Search
None
See application file for complete search history.

(56) References Cited

U.S. PATENT DOCUMENTS

| | | | |
|---|---|---|---|
| 2017/0068258 A1* | 3/2017 | Lyon | ........................ G06F 1/206 |
| 2020/0042052 A1 | 2/2020 | Shabbir et al. | |
| 2020/0378858 A1 | 12/2020 | Curtis et al. | |
| 2021/0088404 A1 | 3/2021 | Li et al. | |

\* cited by examiner

*Primary Examiner* — Ryan A Jarrett
(74) *Attorney, Agent, or Firm* — Larson Newman, LLP (57) ABSTRACT

An information handling system includes a motherboard including a connector interface, and a liquid assisted air cooling (LAAC) module. The LAAC module includes a coolant pump to circulate coolant to one or more components in the information handling system, a leak sensor to detect whether the coolant is leaking, and a processor. The processor detects whether the coolant pump is operating properly. In response to the coolant pump not operating properly, the processor provides a first tachometer signal on a particular pin of the connector interface of the motherboard. The processor further monitors a voltage level received from the leak sensor. A first voltage level indicates a leak being detected, and a second voltage level indicates no leak being detected. In response to the voltage level being the first voltage level, the processor provides a second tachometer signal on the particular pin of the connector interface of the motherboard.

20 Claims, 5 Drawing Sheets

LIQUID ASSISTED AIR COOLING MODULE INTERFACE IN AN INFORMATION HANDLING SYSTEM

FIELD OF THE DISCLOSURE

The present disclosure generally relates to information handling systems, and more particularly relates to a liquid assisted air cooling module interface in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a motherboard including a connector interface, and a liquid assisted air cooling (LAAC) module. The LAAC module includes a coolant pump to circulate coolant to one or more components in the information handling system, and a leak sensor to detect whether the coolant is leaking within the LAAC module A processor may detect whether the coolant pump is operating properly. In response to the coolant pump not operating properly, the processor may provide a first tachometer signal on a particular pin of the connector interface of the motherboard. The processor further may monitor a voltage level received from the leak sensor. A first voltage level may indicate a leak being detected, and a second voltage level may indicate no leak being detected. In response to the voltage level being the first voltage level, the processor may provide a second tachometer signal on the particular pin of the connector interface of the motherboard.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
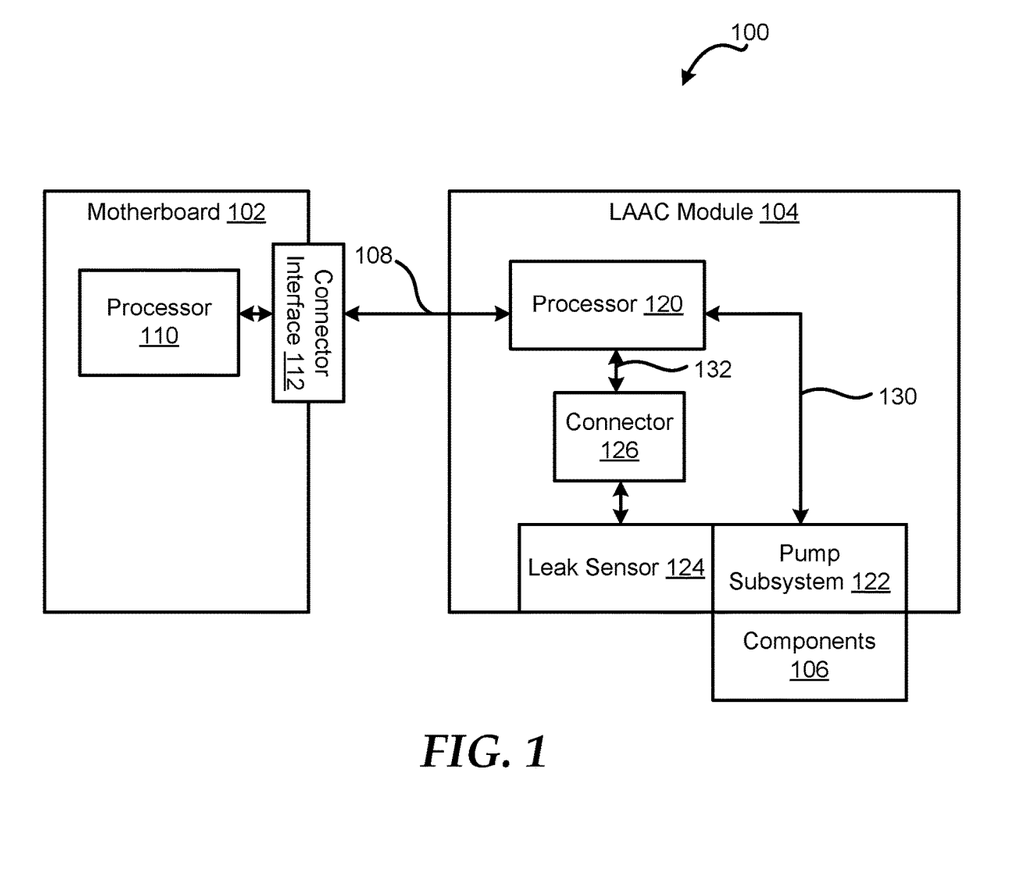
FIG. 1 is a block diagram of a portion of an information handling system according to at least one embodiment of the present disclosure.

FIG. 1 illustrates a portion of an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a motherboard 102, a liquid assisted air cooling (LAAC) module 104, and one or more components 106. Motherboard 102 may communicate with LAAC module 104 over a communication channel 108. Motherboard 102 includes a processor 110 and a connector interface 112. LAAC module 104 includes a processor 120, a pump subsystem 122, a leak sensor 124, and a connector 126. In an example, leak sensor 124 may be any suitable component to detect a coolant leak in pump subsystem 122. For example, leak sensor 124 may be leakage detection rope that may be routed anywhere within LAAC module 104 to monitor for coolant leaks. For example, leak sensor 124 may be placed in physical communication with one or more portions of pump subsystem 122 to monitor for coolant leaks in the pump subsystem. In an example, pump subsystem 122 may be placed in physical communication with one or more components 106 of information handling system 100, and the pump subsystem may provide cooling to the components via heat dissipation by the physical communication.

In previous information handling systems, the LAAC module and the leak sensor may be separate components within the information handling system. In these previous information handling systems, the LAAC module would provide a TACH signal to a motherboard via one connector interface of the motherboard, and the leak sensor would provide a leak out signal to the motherboard via another connector interface of the motherboard. In the previous information handling system, the separate LAAC module and leak sensor would have a large amount of printed circuit board (PCB) real-estate, would need a large amount of cable management, and would need two sets of pin-outs on the motherboard.

Information handling system 100 includes LAAC module 104 and leak sensor 124 as a single module to communicate with motherboard 102 via a single communication channel 108 and a single connector interface 112. In an example, connector interface 112 may include five communication pins, and processor 120 may communicate with processor 110 of motherboard 102 via communication channel 108 and the five communication pins. In certain examples, the pins of connector interface 112 may include a supply voltage pin, a ground voltage pin, a tachometer (TACH) pin, a pulse width modulation (PWM) pin, and an identification (ID) pin.

During operation, processor 120 may provide an identification for LAAC module to processor 110 of motherboard 102 via any suitable manner. For example, processor 120 may transmit the ID for LAAC module 104 over communication channel 108 to the ID pin of connector interface 112. In an example, processor 110 of motherboard 102 may provide a PWM signal over communication channel 108 to processor 120 via the PWM pin of connector interface 112. In certain examples, the PWM signal may be utilized by processor 120 to control the speed of a coolant pump with pump subsystem 122. Processor 120 may provide one or more tachometer (TACH) signals over communication channel 108 to the TACH pin of connector interface 112, and each of the TACH signals may indicate a different state of LAAC module 104.

Figure 2:
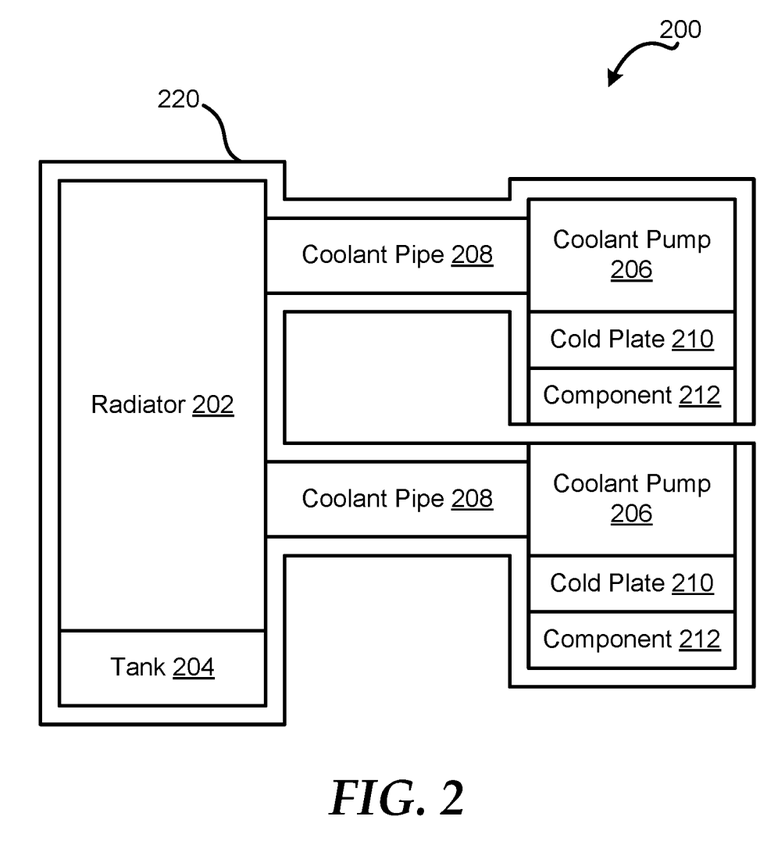
FIG. 2 is a block diagram of a pump subsystem of a liquid assisted air cooling module in an information handling system according to at least one embodiment of the present disclosure.

In an example, processor 120 may perform any suitable operations to detect the different states of LAAC module 104. For example, processor 120 may communicate with pump subsystem 122 over communication channel 130, and the communication may be both control signals for a coolant pump within the pump subsystem and a monitoring of the operation of the coolant pump. In an example, the control signal provided by processor 120 over communication channel 130 may be determined based on the PWM signal received from processor 110 of motherboard 102. Processor 120 may receive one or more signals from pump subsystem 122 over communication channel 130. In certain examples, the signals from pump subsystem 122 to processor 120 may indicate whether a coolant pump, such as coolant pump 206 in FIG. 2, is operating properly or the coolant pump has failed. Based on whether the signal from pump subsystem 122 indicates a failure of coolant pump, processor 120 may provide one of two different TACH signals to connector interface 112.

In response to a signal indicating that the coolant pump is operating properly, processor 120 may provide a low speed TACH signal over communication channel 108 to the TACH pin of connector interface 112. Based on the low speed TACH signal, processor 110 may determine that the coolant pump is operating properly. In an example, based on pump subsystem 122 provide a signal to processor 120 indicating a failure of the coolant pump, the processor may provide a different TACH signal to processor 110. For example, processor 120 may provide a steady state or static TACH signal over communication channel 108 to the TACH pin of connector interface 112. Based on the static TACH signal, processor 110 may determine a failure of the coolant pump has occurred and that the coolant pump needs to be replaced. In certain examples, the static TACH signal may be any suitable constant voltage, such as a digital high voltage, a digital low voltage, or the like.

In certain examples, leak sensor 124 and connector 126 may perform one or more operations to notify processor 120 whether there is a coolant leak within pump subsystem 122. For example, when no leak is detected by leak sensor 124, connector 126 may provide a first output signal to processor 120. In an example, the first output signal may be any suitable digital voltage level, such as a digital voltage level or a digital low voltage level. When a leak is detected by leak sensor 124, connector 126 may provide a second output signal to processor 120. In an example, the second output signal may be any suitable digital voltage level, such as the opposite digital voltage level as the first output signal.

In an example, leak sensor 124 may be a leakage detector rope that may change resistance based on whether a leak has been detected. For example, if leak sensor 124 detects a leak in pump subsystem 122, the resistance of the leak sensor may decrease, which in turn may cause the output signal from connector 126 drop from a digital high voltage to a digital low voltage. In this example, the digital low voltage from connector 126 may indicate the presence of a coolant leak within pump subsystem 122.

In certain examples, connector 126 may be any suitable component to provide the leakage output signal over a communication channel 132 to processor 132. For example, connector 126 may be connected to processor 120 via four pins and communication channel 132. In an example, the pins from connector 126 may include a supply voltage pin with an associated ground pin, and an output signal pin with an associated ground pin. Connector 126 may provide a leakage detect signal from output signal pin over communication channel 132 to processor 120. In an example, processor 120 may include an analog-to-digital converter to put the leakage detect signal in a digital form.

In response to receiving the leakage detect signal from connector 126, processor 120 may provide any suitable TACH signal over communication channel 108 to the TACH pin of connector interface 112 to indicate that a coolant leak has been detected. In an example, the TACH signal indicating a coolant leak may be a high speed TACH signal. Based on the high speed TACH signal, processor 110 may determine that a coolant leak has been detected. In response the determination of a coolant leak being detected, processor 110 of motherboard 102 may immediately provide a PWM signal from the PWM pin of connector interface 112 over communication channel 108 to processor 120, which in turn may shut down the coolant pump to prevent further coolant leaks in pump subsystem 122.

In an example, processor 120 may have different priorities for errors in pump subsystem 122. For example, a leakage detection may have the highest priority level. In this example, when a leak detection signal is received from leak sensor 124, processor 120 may immediately provide the high speed TACH signal to processor 110 of motherboard 102 even if processor 120 was currently providing the static TACH signal to indicate failure of the coolant pump. The high priority of the leak detection with processor 120 may result in the processor no longer monitoring the signal from pump subsystem 122 over communication channel 130 but immediately provide the high speed TACH signal to processor 110 of motherboard 102.

FIG. 2 illustrates a pump subsystem 200 of a LAAC module according to at least one embodiment of the present disclosure. In an example, pump subsystem 200 may be substantially similar to pump subsystem 122 of FIG. 1, and the LAAC module may be substantially similar to LAAC module 104 of FIG. 1. Pump subsystem 200 includes a radiator 202, a tank 204, one or more coolant pumps 206 connected to the radiator via respective coolant pipe 208. Pump subsystem 200 further includes one or more cold plates 210, which may be placed in physical communication with one or more respective components 212. A leak sensor 220 may be placed in any suitable location with respect to pump subsystem 200. For example, leak sensor 220 may be placed below pump subsystem 200. In an example, leak sensor 220 may be substantially similar to leak sensor 124 of FIG. 1. For clarity and brevity, operation of pump subsystem 200 will be described with respect to a single set of coolant pump 206, coolant pipe 208, cold plate 210, and component 212.

In an example, component 212 may be any suitable component of an information handling system that may produce a substantially amount of heat during operation. For example, component 212 may be a processor, a graphics processing unit, a memory device, or the like. In an example, coolant pump 206 may operate to provide coolant a liquid coolant, such as water, to cold plate 210, which in turn may be combined with cooling airflow with an information handling system to cool component 212. For example, coolant pump 206 may cause coolant to circulate from tank 204 to radiator 202, through coolant pipe 208, coolant pump 206 and cold plate 210, and back to the tank in the reverse order.

In an example, the coolant may flow through radiator 202 in any suitable manner, such as via a coolant tunnel within the radiator. As the coolant travels through the coolant tunnel, the coolant is cooled by airflow push or pulled through radiator 202 via a cooling fan. In certain examples, radiator 202 may include multiple fins to increase the area of physical contact between the coolant tunnel and airflow, which in turn may improve a heat dissipation efficiency of the coolant.

During operation of pump subsystem 200, a coolant leak may be formed anywhere along the coolant circulation path of tank 204, radiator 202, coolant pipe 208, coolant pump 206, and cold plate 210. In an example, leak sensor 220 may be placed below the coolant circulation path of pump subsystem 200. In certain examples, leak sensor 220 may be located in between pump subsystem 200 and a platform within the information handling system. The platform of the information handling system is the support structure to hold the pump subsystem 200 within the information handling system. In an example, the platform may include a tray to hold or support radiator 202, and leak sensor 220 may be placed in physical communication with the tray. Additionally, an absorbent material may be placed on top of leak sensor 220, and the absorbent material may distribute any coolant leak from radiator 202 across the leak sensor. In certain examples, leak sensor 220 may detect the coolant leak in any suitable manner, such as a resistance of the leak sensor changing based on the coolant being in physical communication with the leak sensor. In an example, this resistance change may be provided to a processor, such as processor 120 of FIG. 1, to indicate that a leak has occurred.

While the detection of a leak from radiator 202 has been described, the detection of a leak from coolant pipe 208, coolant pump 206, and/or cold plate 210 may be performed by leak sensor 220 in substantially the same manner.

Referring back to FIG. 1, leak sensor 124 may interface with pump subsystem 122 in any suitable manner to determine whether a coolant leak has occurred within the pump subsystem. For example, leak sensor 124 may monitor pump subsystem 122 in substantially the same manner as described above with respect to leak sensor 220 and pump subsystem 200 of FIG. 2. Connector 126 may provide the leak detection signal from leak sensor 124 to processor 120. In response to a reception of the leak detection signal, processor 120 may provide a tachometer signal on communication channel 108 to indicate the detection of a leak within pump subsystem 122. In an example, processor 120 may provide different tachometer signals to processor 110 based on a current state of LAAC module 104 as shown in FIG. 3.

Figure 3:
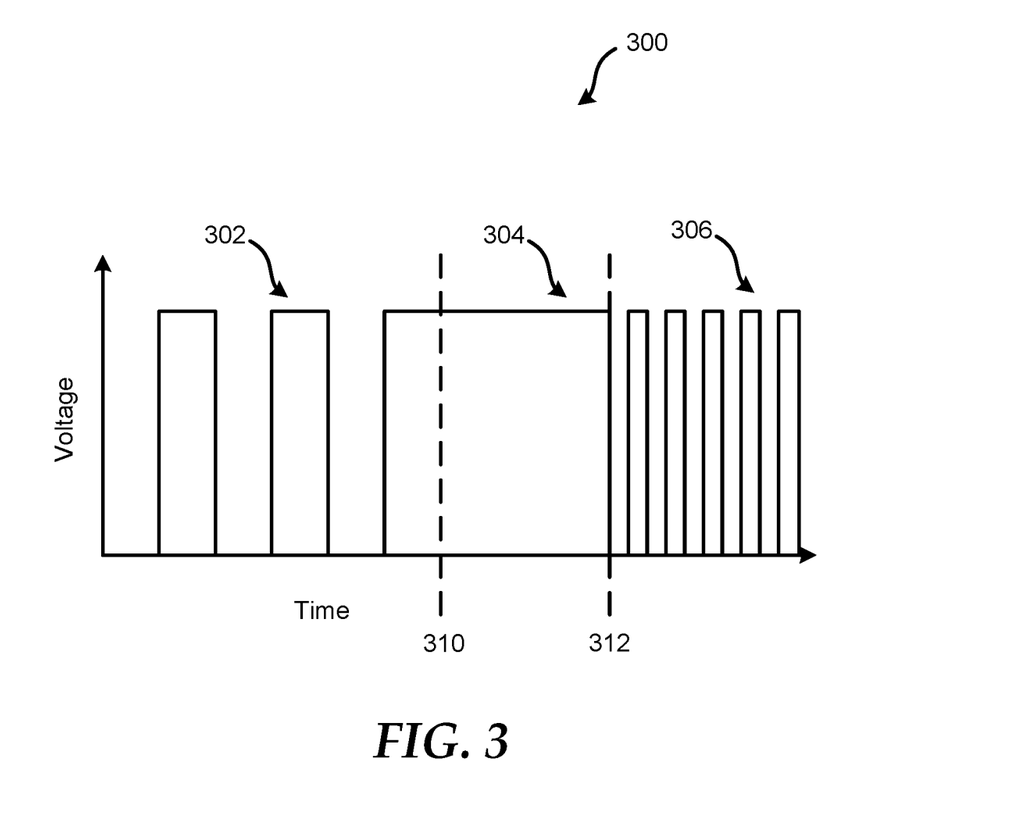
FIG. 3 is a waveform of an output signal from a processor in a liquid assisted air cooling module of an information handling system according to at least one embodiment of the present disclosure.

FIG. 3 illustrates a waveform 300 of an output signal from a processor in a LAAC module of an information handling system, such as processor 120 in LAAC module 104 of information handling system 100 in FIG. 1, according to at least one embodiment of the present disclosure. Waveform 300 may be created from waveforms 302, 304, and 306. In an example, any portion 302, 304, or 306 may be provided on communication channel 108 of FIG. 1 based on a current state of LAAC module 104 of FIG. 1.

In an example, waveform 302 may indicate that a coolant pump, such as coolant pump 206 of FIG. 2, of a pump subsystem, such as pump subsystem 122 or 200, is properly operating and no leak is detected. In certain examples, waveform 302 may be any suitable tachometer signal including, but not limited to, a pulse width modulated (PWM) signal. Waveform 302 may switch at any particular speed to indicate that pump subsystem is properly operating and no leak is detected. For example, waveform 302 of a tachometer signal may have any suitable speed below a maximum speed for the PWM waveform.

While providing waveform 302 on communication channel 108, processor 120 of FIG. 1 may detect a failure of a coolant pump within pump subsystem 122 of FIG. 1 at time point 310. In response to detecting the coolant pump failure, processor 120 may provide waveform 304 to indicate that the coolant pump within pump subsystem 122 of FIG. 1 has failed or otherwise is not operating properly. In an example, the waveform 304 may be a static tachometer signal. For example, waveform 304 may be a static digital high voltage, as shown in FIG. 3, or may be a static digital low voltage.

While providing waveform 304 on communication channel 108, processor 120 may receive a leak indicator from leak sensor 124 at time point 312. In response to receiving the leak indicator, processor 120 may provide waveform 306 on communication channel 108 to indicate the detected leak. In an example, waveform 306 may be any suitable tachometer signal including, but not limited to, a PWM signal. Waveform 306 may switch at any particular speed to indicate that a leak is detected. For example, waveform 306 of a tachometer signal may have a speed greater than the maximum speed for the PWM waveform. In an example, the speed of waveform 306 may be greater than the maximum speed plus a predetermined margin.

In certain examples, one of waveforms 302, 304, and 306 may be provided on communication channel 108 to provide an indication of a current state in LAAC module 104. For example, waveform 302 may be provided to indicate that the coolant pump is operating properly and that no leak has been detected. Waveform 304 may be provided to indicate that the coolant pump has failed but no leak has been detected. Waveform 306 may be provided to indicate that a leak has been detected in pump subsystem 122.

Figure 4:
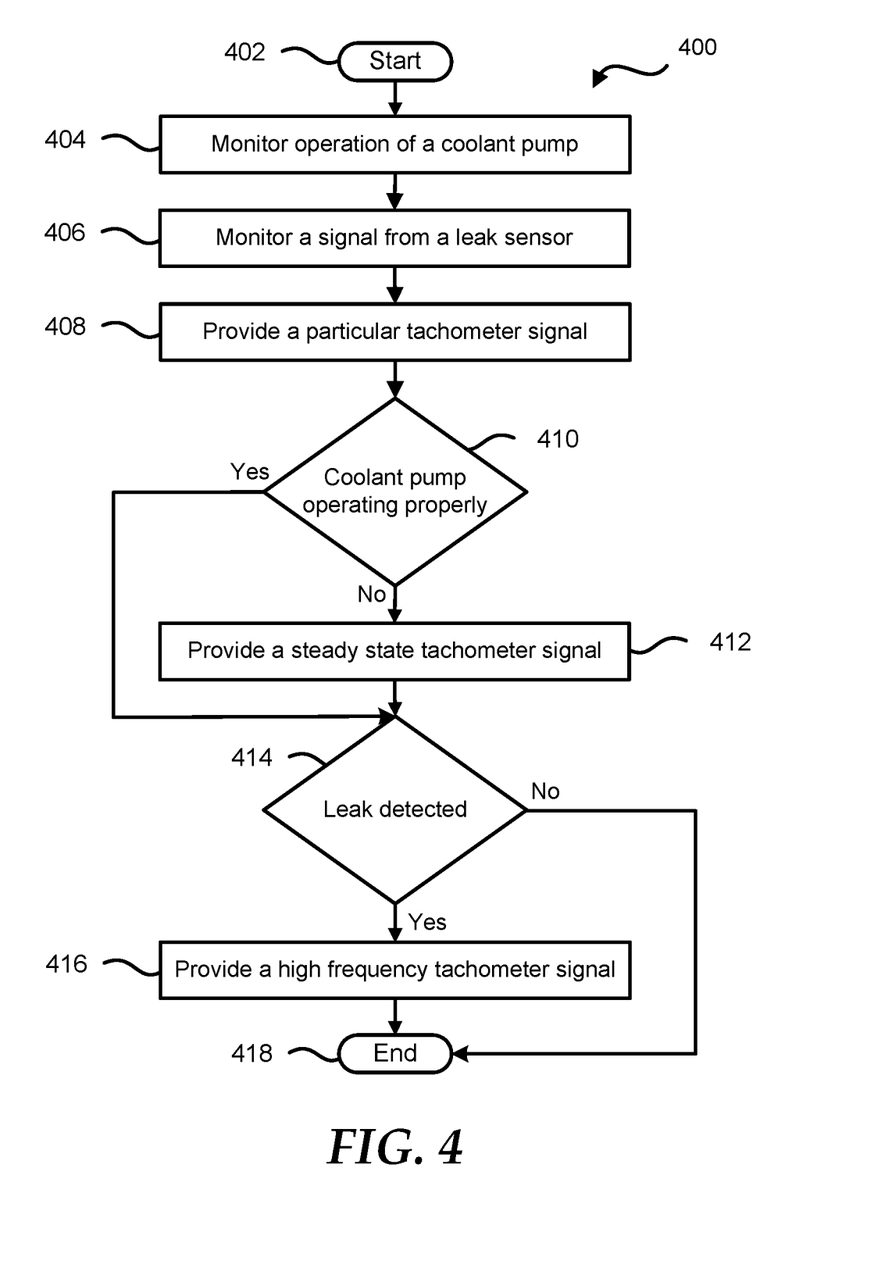
FIG. 4 is a flow diagram of method for monitoring a liquid assisted air cooling module in an information handling system according to at least one embodiment of the present disclosure.

FIG. 4 illustrates a flow diagram of a method 400 for monitoring a liquid assisted air cooling (LAAC) module in an information handling system according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by processor 120 of FIG. 1, or any other type of controller, device, module, processor, or any combination thereof, operable to employ all, or portions of, the method of FIG. 4.

At block 404, operation of a coolant pump of a LAAC module is monitored. In an example, the coolant pump may be utilized to circulate coolant within a pump subsystem, which in turn may be used to cool a component of an information handling system. At block 406, a signal from a leak sensor of the LAAC module is monitored. In an example, the signal from the leak sensor may indicate either no leak has been detected or a leak has been detected.

At block 408, a particular tachometer signal is provided. In an example, a processor of the LAAC module may provide the particular tachometer signal to a motherboard over a communication channel. In certain examples, the particular tachometer signal may be any suitable PWM signal to indicate that the coolant pump is operating properly and that no leak has been detected. For example, the particular tachometer signal may be a tachometer signal with any suitable speed below a maximum speed for a PWM waveform within LAAC the module.

At block 410, a determination is made whether the coolant pump is operating properly. If the coolant pump is operating properly, the flow continues at block 414. If the coolant pump is not operating properly, a steady state tachometer signal is provided at block 412. In an example, the processor of the LAAC module may provide the steady state or static tachometer signal to the motherboard over the communication channel. In certain examples, the static tachometer signal may be either a static digital high voltage or a static digital low voltage.

At block 414, a determination is made whether a leak has been detected in a pump subsystem of the LAAC. If a leak has been detected, the flow continues at block 416. Otherwise if a leak has not been detected the flow ends at block 418. In response to the leak being detected, a high frequency or high speed tachometer signal is provided at block 416, and the flow ends at block 418. In an example, the processor of the LAAC module may provide the high frequency or high speed tachometer signal to the motherboard over the communication channel. In certain examples, the high speed tachometer signal may be any suitable PWM signal to indicate that the coolant leak has been detected. For example, the high speed tachometer signal may be a tachometer signal with any suitable speed above the maximum speed for a PWM waveform within LAAC the module, such as the maximum speed plus a particular margin.

Figure 5:
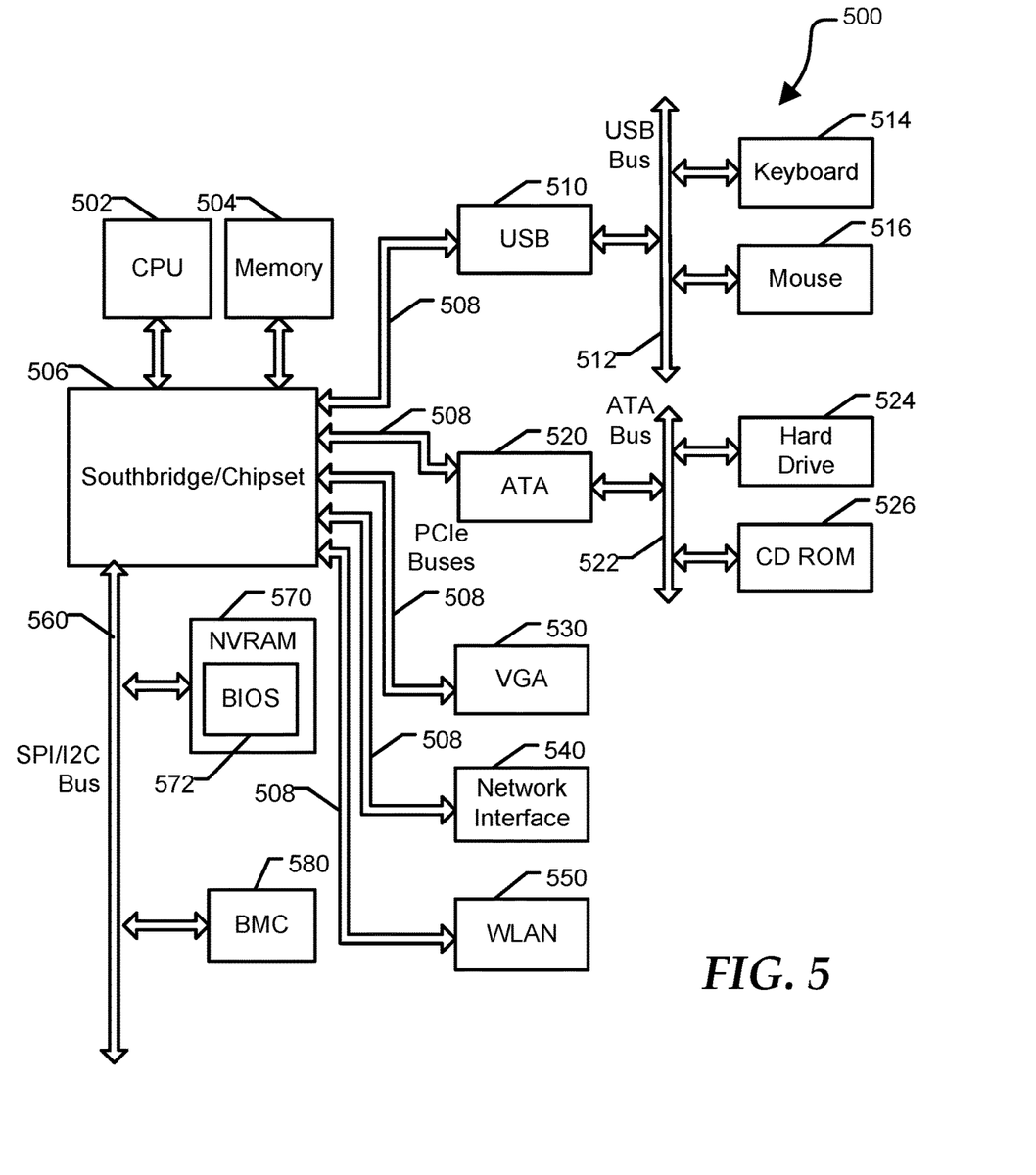
FIG. 5 is a block diagram of an information handling system according to an embodiment of the present disclosure.

FIG. 5 illustrates an information handling system 500 including a processor 502, a memory 504, a chipset 506, a PCI bus 508, a universal serial bus (USB) controller 510, a USB 512, a keyboard device controller 514, a mouse device controller 516, a configuration database 518, an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a flash memory device 570 for storing BIOS code 572, a trusted platform module (TPM) 580, and a baseboard management controller (EC) 590. EC 590 can be referred to as a service processor, and embedded controller, and the like. Flash memory device 570 can be referred to as a SPI flash device, BIOS non-volatile random access memory (NVRAM), and the like. EC 590 is configured to provide out-of-band access to devices at information handling system 500. As used herein, out-of-band access herein refers to operations performed without support of CPU 502, such as prior to execution of BIOS code 572 by processor 502 to initialize operation of system 500.

In an embodiment, system 500 can further include a platform security processor (PSP) 574 and/or a management engine (ME) 576. In particular, an x86 processor provided by AMD can include PSP 574, while ME 576 is typically associated with systems based on Intel x86 processors.

PSP 574 and ME 576 are processors that can operate independently of core processors at CPU 502, and that can execute firmware prior to the execution of the BIOS by a primary CPU core processor. PSP 574, included in recent AMD-based systems, is a microcontroller that includes dedicated read-only memory (ROM) and static random access memory (SRAM). PSP 574 is an isolated processor that runs independently from the main CPU processor cores. PSP 574 has access to firmware stored at flash memory device 570. During the earliest stages of initialization of system 500, PSP 574 is configured to authenticate the first block of BIOS code stored at flash memory device 570 before releasing the x86 processor from reset. Accordingly, PSP 574 provides a hardware root of trust for system 500. ME 576 provides similar functionality in Intel-based systems. In another embodiment, EC 590 can provide aspects of a hardware root of trust. The root of trust relates to software processes and/or hardware devices that ensure that firmware and other software necessary for operation of an information handling system is operating as expected.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One ore more components can be integrated together. For example, portions of chipset 506 can be integrated within CPU 502. In an embodiment, chipset 506 can include a platform controller hub (PCH). System 500 can include additional buses and bus protocols, for example I2C and the like. Additional components of information handling system 500 can include one or more storage devices that can store machine-executable code, one or more communications ports for communicating with external devices, and various input and output (I/O) devices, such as a keyboard, a mouse, and a video display.

For purposes of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

BIOS code 572 can be referred to as a firmware image, and the term BIOS is herein used interchangeably with the term firmware image, or simply firmware. In an embodiment, BIOS 572 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 500. While the techniques disclosed herein are described in the context of a UEFI compliant system, one of skill will appreciate that aspects of the disclosed systems and methods can be implemented at substantially any information handling system having configurable firmware.

BIOS code 572 includes instructions executable by CPU 502 to initialize and test the hardware components of system 500, and to load a boot loader or an operating system (OS) from a mass storage device. BIOS code 572 additionally provides an abstraction layer for the hardware, i.e. a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

The storage capacity of SPI flash device 570 is typically limited to 32 MB or 64 MB of data. However, original equipment manufacturers (OEMs) of information handling systems may desire to provide advanced firmware capabilities, resulting in a BIOS image that is too large to fit in SPI flash device 570. Information handling system can include other non-volatile flash memory devices, in addition to SPI flash device 570. For example, memory 504 can include non-volatile memory devices in addition to dynamic random access memory devices. Such memory is referred to herein as non-volatile dual in-line memory module (NVDIMM) devices. In addition, hard drive 524 can include non-volatile storage elements, referred to as a solid state drive (SSD). For still another example, information handling system 500 can include one or more non-volatile memory express (NVMe) devices. Techniques disclosed herein provide for storing a portion of a BIOS image at one or more non-volatile memory devices in addition to SPI flash device 570.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a motherboard including a connector interface; and
a liquid assisted air cooling (LAAC) module to communicate with the connector interface of the motherboard, the LAAC module including:
a coolant pump to circulate coolant to one or more components in the information handling system;
a leak sensor to detect whether the coolant is leaking within the LAAC module; and
a processor to communicate with the coolant pump and the leak sensor, the processor to:
detect whether the coolant pump is operating properly;
in response to the coolant pump not operating properly, provide a first tachometer signal on a particular pin of the connector interface of the motherboard;
monitor a voltage level received from the leak sensor, wherein a first voltage level indicates a leak being detected, and a second voltage level indicates no leak being detected; and
in response to the voltage level being the first voltage level, provide a second tachometer signal on the particular pin of the connector interface of the motherboard, wherein the second tachometer signal is a pulse width modulated signal, and a speed of the second tachometer signal is greater than a maximum speed for the pulse width modulated signal.

2. The information handling system of claim 1, wherein in response to reception of the second tachometer signal, the motherboard to shut down the coolant pump.

3. The information handling system of claim 1, wherein in response to reception of the second tachometer signal, the motherboard to log a leakage failure.

4. The information handling system of claim 1, wherein the detection of a leak is a higher priority than the coolant pump not operating properly.

5. The information handling system of claim 1, wherein in response to the coolant pump operating properly and no leak being detected, the processor to provide a third tachometer signal on the particular pin of the connector interface.

6. The information handling system of claim 1, wherein the first tachometer signal is a static signal.

7. The information handling system of claim 1, wherein second tachometer signal is a high frequency signal.

8. The information handling system of claim 1, wherein the leak sensor is a leak detector rope.

9. A method comprising:
  detecting, by a processor of a liquid assisted air cooling (LAAC) module in an information handling system, whether a coolant pump of the information handling system is operating properly;
  in response to the coolant pump not operating properly, providing a first tachometer signal on a particular pin of a connector interface of a motherboard in the information handling system;
  monitoring, by the processor, a voltage level received from a leak sensor, wherein a first voltage level indicates a leak being detected, and a second voltage level indicates no leak being detected; and
  in response to the voltage level being the first voltage level, providing a second tachometer signal on the particular pin of the connector interface of the motherboard, wherein the second tachometer signal is a pulse width modulated signal, and a speed of the second tachometer signal is greater than a maximum speed for the pulse width modulated signal.

10. The method of claim 9, wherein in response to reception of the second tachometer signal, the method further comprises:
  shutting down, by the motherboard, the coolant pump.

11. The method of claim 9, wherein in response to reception of the second tachometer signal, the method further comprises:
  logging, by the motherboard, a leakage failure in the LAAC module.

12. The method of claim 9, wherein the detection of a leak is a higher priority than the coolant pump not operating properly.

13. The method of claim 9, wherein in response to the coolant pump operating properly and no leak being detected, the method further comprises:
  providing, by the processor, a third tachometer signal on the particular pin of the connector interface.

14. The method of claim 9, wherein the first tachometer signal is a static signal.

15. The method of claim 9, wherein second tachometer signal is a high frequency signal.

16. An information handling system comprising:
  a motherboard including a connector interface; and
  a liquid assisted air cooling (LAAC) module to communicate with the connector interface of the motherboard, the LAAC module including:
    a coolant pump to circulate coolant to one or more components in the information handling system;
    a leak sensor to detect whether the coolant is leaking within the LAAC module; and
    a processor to communicate with the coolant pump and the leak sensor, the processor to:
      if the coolant pump is not operating properly, then provide a first tachometer signal on a particular pin of the connector interface of the motherboard;
      monitor a voltage level received from the leak sensor, wherein a first voltage level indicates a leak being detected, and a second voltage level indicates no leak being detected;
      if the voltage level is the first voltage level, then provide a second tachometer signal on the particular pin of the connector interface of the motherboard, wherein the second tachometer signal is a pulse width modulated signal, and a speed of the second tachometer signal is greater than a maximum speed for the pulse width modulated signal, wherein in response to reception of the second tachometer signal, the motherboard to shut down the coolant pump;
      if the coolant pump is operating properly and no leak being detected, then the processor to provide a third tachometer signal on the particular pin of the connector interface.

17. The information handling system of claim 16, wherein in response to reception of the second tachometer signal, the motherboard to log a leakage failure.

18. The information handling system of claim 16, wherein the detection of a leak is a higher priority than the coolant pump not operating properly.

19. The information handling system of claim 16, wherein the first tachometer signal is a static signal.

20. The information handling system of claim 16, wherein second tachometer signal is a high frequency signal.

* * * * *